(12) United States Patent
Shimizu et al.

(10) Patent No.: US 10,027,713 B2
(45) Date of Patent: Jul. 17, 2018

(54) INFORMATION PROCESSING APPARATUS THAT DISTRIBUTES SETTINGS COMPLIANT WITH SECURITY POLICY AND CONTROL METHOD THEREFOR, IMAGE PROCESSING APPARATUS AND CONTROL METHOD THEREFOR, INFORMATION PROCESSING SYSTEM AND CONTROL METHOD THEREFOR, AND STORAGE MEDIUM

(71) Applicant: CANON KABUSHIKI KAISHA, Tokyo (JP)

(72) Inventors: Shota Shimizu, Kawasaki (JP); Naoki Tsuchitoi, Kawasaki (JP); Akari Yasukawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/471,526

(22) Filed: Aug. 28, 2014

(65) Prior Publication Data

US 2015/0067767 A1 Mar. 5, 2015

(30) Foreign Application Priority Data

Sep. 2, 2013 (JP) ................................. 2013-181353

(51) Int. Cl.
*H04L 29/06* (2006.01)

(52) U.S. Cl.
CPC .......... *H04L 63/20* (2013.01); *H04L 63/0254* (2013.01); *H04L 63/0263* (2013.01)

(58) Field of Classification Search
CPC . H04L 63/20; H04L 63/0227; H04L 63/0254; H04L 29/06578; H04L 29/06986; G06F 21/10

(Continued)

(56) References Cited

U.S. PATENT DOCUMENTS 6,239,729 B1 * 5/2001 Takeuchi ............... G09G 5/008
 341/100
6,480,963 B1 11/2002 Tachibana et al.
(Continued)

FOREIGN PATENT DOCUMENTS

CN 102520948 A 6/2012
CN 102929675 A 2/2013
(Continued)

OTHER PUBLICATIONS

Office Action issued in Chinese Patent Application No. 201410441543.7 dated Feb. 3, 2017. English translation provided.

(Continued)

*Primary Examiner* — Izunna Okeke
*Assistant Examiner* — Shahriar Zarrineh
(74) *Attorney, Agent, or Firm* — Rossi, Kimms & McDowell LLP

(57) ABSTRACT

An information processing apparatus that makes it possible to save time and effort expended by an administrator on distribution of settings compliant with a security policy. Whether or not an application installed in the image processing apparatus to which setting values compliant with a security policy are to be distributed can be set to the settings is determined. When it is determined that the application cannot be set to the settings, whether or not the application can be set to the settings by updating thereof is determined. When the determination result indicates that the settings can be set by updating the application, the application is updated, and the settings are distributed to the image processing apparatus.

11 Claims, 8 Drawing Sheets

(58) Field of Classification Search
USPC ............................................................ 726/1
See application file for complete search history.

(56) References Cited

U.S. PATENT DOCUMENTS

| | | | | |
|---|---|---|---|---|
| 8,904,477 | B2* | 12/2014 | Barton | G06F 21/604 380/270 |
| 9,536,099 | B2* | 1/2017 | Iwadate | G06F 21/604 |
| 2004/0093598 | A1* | 5/2004 | Haga | G06F 8/65 717/173 |
| 2004/0111462 | A1* | 6/2004 | Minato | G06K 15/00 709/200 |
| 2004/0243994 | A1* | 12/2004 | Nasu | G06F 8/65 717/171 |
| 2005/0021693 | A1* | 1/2005 | Tsuda | G06F 8/60 709/220 |
| 2005/0094787 | A1* | 5/2005 | Atobe | H04N 1/00204 379/111 |
| 2005/0108518 | A1* | 5/2005 | Pandya | H04L 63/0485 713/151 |
| 2005/0216748 | A1* | 9/2005 | Yeung | G06F 21/70 713/187 |
| 2006/0101097 | A1* | 5/2006 | Barboi | G06F 11/1471 |
| 2006/0117195 | A1* | 6/2006 | Niwa | G06F 1/266 713/300 |
| 2007/0008570 | A1* | 1/2007 | Okamoto | H04N 1/00278 358/1.14 |
| 2007/0050398 | A1* | 3/2007 | Mochizuki | G06F 21/604 |
| 2007/0083915 | A1* | 4/2007 | Janakiraman | G06F 21/316 726/4 |
| 2007/0156670 | A1* | 7/2007 | Lim | G06F 21/6218 |
| 2007/0206088 | A1* | 9/2007 | Mizunashi | H04N 7/16 348/14.01 |
| 2007/0211954 | A1* | 9/2007 | Ohara | G06F 21/608 382/254 |
| 2007/0229871 | A1* | 10/2007 | Hikichi | H04N 1/00413 358/1.13 |
| 2008/0013121 | A1* | 1/2008 | Teshima | H04N 1/32609 358/1.14 |
| 2008/0059960 | A1* | 3/2008 | Akiyoshi | G06F 9/4406 717/170 |
| 2008/0127307 | A1* | 5/2008 | Fukuta | G06F 21/608 726/3 |
| 2008/0263230 | A1* | 10/2008 | Mizuno | G03G 15/5075 710/8 |
| 2008/0301814 | A1* | 12/2008 | Takahashi | G06F 21/70 726/25 |
| 2009/0006989 | A1* | 1/2009 | Park | G06F 8/38 715/762 |
| 2009/0059279 | A1* | 3/2009 | Sakurai | G06F 3/1205 358/1.15 |
| 2009/0080013 | A1* | 3/2009 | Sato | H04N 1/00204 358/1.15 |
| 2009/0161993 | A1* | 6/2009 | Matsunoshita | H04N 1/00846 382/305 |
| 2009/0177806 | A1* | 7/2009 | Nishikawa | G06F 8/65 710/10 |
| 2009/0235242 | A1* | 9/2009 | Kawaguchi | H04N 1/00002 717/168 |
| 2009/0249215 | A1* | 10/2009 | Paek | H04L 41/0816 715/740 |
| 2009/0320016 | A1* | 12/2009 | Takatani | G06F 8/65 717/171 |
| 2010/0122187 | A1* | 5/2010 | Kunori | G06F 3/04845 715/762 |
| 2011/0010779 | A1* | 1/2011 | Nakagawa | G06F 21/105 726/30 |
| 2011/0038005 | A1* | 2/2011 | Ochiai | G03G 15/5075 358/1.15 |
| 2011/0066721 | A1* | 3/2011 | Shinomiya | G06F 21/10 709/224 |
| 2011/0066960 | A1* | 3/2011 | Suzuki | G06F 8/65 715/764 |
| 2011/0162036 | A1* | 6/2011 | Heo | G06F 21/31 726/1 |
| 2011/0164269 | A1* | 7/2011 | Kamishiro | G06F 21/31 358/1.13 |
| 2011/0231701 | A1* | 9/2011 | Aoki | G03G 15/5079 714/15 |
| 2011/0242561 | A1* | 10/2011 | Nitta | G06F 3/04886 358/1.9 |
| 2012/0054730 | A1* | 3/2012 | Michishita | G06F 8/665 717/169 |
| 2013/0007439 | A1* | 1/2013 | Yamashita | G06F 9/441 713/2 |
| 2013/0027743 | A1* | 1/2013 | Enami | G06F 3/1204 358/1.15 |
| 2013/0042098 | A1* | 2/2013 | Baik | G06F 9/4401 713/2 |
| 2013/0063761 | A1* | 3/2013 | Uchibori | G06F 3/1285 358/1.14 |
| 2013/0117738 | A1 | 5/2013 | Livingston et al. | |
| 2013/0173736 | A1* | 7/2013 | Krzeminski | H04W 12/10 709/213 |
| 2013/0335770 | A1* | 12/2013 | Yasukawa | G06F 3/1238 358/1.14 |
| 2014/0029049 | A1* | 1/2014 | Takahashi | H04N 1/00973 358/1.15 |
| 2014/0068733 | A1* | 3/2014 | Belisario | G06F 21/46 726/6 |
| 2014/0123325 | A1* | 5/2014 | Jung | G06F 21/6254 726/30 |
| 2014/0129820 | A1* | 5/2014 | Lim | G06F 9/4401 713/2 |
| 2014/0215499 | A1* | 7/2014 | Kawai | G06F 9/44536 719/328 |
| 2014/0270836 | A1* | 9/2014 | Chosokabe | G03G 15/5016 399/70 |

FOREIGN PATENT DOCUMENTS

| | | |
|---|---|---|
| JP | H06175832 A | 6/1994 |
| JP | 2002055839 A | 2/2002 |
| JP | 3969467 B2 | 9/2007 |
| JP | 2010282479 A | 12/2010 |

OTHER PUBLICATIONS

Office Action in Japanese Patent Application No. 2013-181353 dated Jul. 11, 2017.

* cited by examiner

FIG. 4A

| DEVICE NAME | APPLICATION NAME | VERSION | SUPPORTED SECURITY POLICY ITEMS |
|---|---|---|---|
| A | LOGIN APPLICATION | 1.0 | LOG ACQUISITION |
| | TRANSMISSION APPLICATION | 2.0 | LOG ACQUISITION MINIMUM LENGTH OF PASSWORD |

FIG. 4B

| DEVICE NAME | APPLICATION NAME | VERSION | SUPPORTED SECURITY POLICY ITEMS |
|---|---|---|---|
| B | LOGIN APPLICATION | 1.1 | LOG ACQUISITION MINIMUM LENGTH OF PASSWORD |
| | TRANSMISSION APPLICATION | 2.0 | LOG ACQUISITION MINIMUM LENGTH OF PASSWORD |

FIG. 4C

| DEVICE NAME | APPLICATION NAME | VERSION | SUPPORTED SECURITY POLICY ITEMS |
|---|---|---|---|
| A | LOGIN APPLICATION | 1.1 | LOG ACQUISITION MINIMUM LENGTH OF PASSWORD |
| | TRANSMISSION APPLICATION | 2.0 | LOG ACQUISITION MINIMUM LENGTH OF PASSWORD |

FIG. 4D

| DEVICE NAME | APPLICATION NAME | VERSION | UNSUPPORTED SECURITY POLICY ITEMS |
|---|---|---|---|
| A | LOGIN APPLICATION | 1.0 | MINIMUM LENGTH OF PASSWORD |

FIG. 4E

| APPLICATION NAME | VERSION | SUPPORTED SECURITY POLICY ITEMS |
|---|---|---|
| LOGIN APPLICATION | 1.0 | LOG ACQUISITION |
| LOGIN APPLICATION | 1.1 | LOG ACQUISITION MINIMUM LENGTH OF PASSWORD |
| TRANSMISSION APPLICATION | 1.2 | LOG ACQUISITION MINIMUM LENGTH OF PASSWORD |

INFORMATION PROCESSING APPARATUS THAT DISTRIBUTES SETTINGS COMPLIANT WITH SECURITY POLICY AND CONTROL METHOD THEREFOR, IMAGE PROCESSING APPARATUS AND CONTROL METHOD THEREFOR, INFORMATION PROCESSING SYSTEM AND CONTROL METHOD THEREFOR, AND STORAGE MEDIUM

BACKGROUND OF THE INVENTION

Field of the Invention

The present invention relates to an information processing apparatus that distributes settings compliant with a security policy and a control method therefor, an image processing apparatus and a control method therefor, an information processing system and a control method therefor, and a storage medium.

Description of the Related Art

It is desirable that personal computers (hereinafter abbreviated as "PCs") and server apparatuses, such as a file server and an authentication server, which are connected to a network in an office or the like are operated in compliance with an information security policy defined on an office basis.

The information security policy is a basic policy concerning the information security of an entire company, and is a collection of policies as to the use of information and prevention of invasion from external apparatuses and leakage of information. The security policy is developed, for example, by an administrator in charge of security.

The apparatuses connected to the network in an office include not only the PCs and the server apparatuses but also peripheral apparatuses, such as image processing apparatuses. Recent image processing apparatuses come to not only simply print or transmit images, but also store image data and provide a file service function for the PCs, to thereby play the same roles as played by other server apparatuses existing on the network.

Further, application development environments for recent image processing apparatuses are made open to the public, and similarly to the cases of PCs and the like, applications developed by third parties are made available.

To maintain a safe and secure office environment, the image processing apparatus are requested to be operated in compliance with the information security policy, similarly to the PCs and server apparatuses. What is meant by "being compliant with an information security policy" is that an image processing apparatus in an office complies with restrictions imposed on operation thereof in view of security so as to prevent unauthorized use thereof or leakage of information, e.g. by making user authentication absolutely necessary before the image processing apparatus is operated by a user.

To make users compliant with the information security policy, there is envisaged, for example, a method of distributing settings dependent on an operating system (OS) to PCs and server apparatuses. According to this method, the operation settings of functions provided by the OS are distributed to the PCs and server apparatuses, and the use of the functions is restricted, whereby each user is caused to be compliant with the information security policy.

In the case of PCs and the server apparatuses, the OS provides basic functions to which the information security policy is to be applied, such as an authentication function, and hence by properly configuring the settings of the OS, it is possible to make the PCs and the server apparatuses compliant with the information security policy.

On the other hand, some image processing apparatuses cannot be made compliant with the information security policy by the same method as employed in the PCs and the sever apparatuses. For example, in the case of image processing apparatuses, basic functions to which the information security policy is applied are provided by an application installed therein. In this case, to make the image processing apparatuses compliant with the security policy, distribution of the settings of the OS is not enough, but it is necessary to properly configure the settings of the application.

In relation to this, there has been disclosed a unit configured to process data before transmission according to a function equipped in an apparatus at a transmission destination and then transmit the data to the apparatus (see e.g. Japanese Patent No. 3969467). In this technique, first, when some data is to be transmitted, the transmission unit inquires about processing which can be executed by the apparatus at the transmission destination. Next, the transmission unit processes the data into a form processable by the apparatus at the transmission destination, and then transmits the processed data.

By using this technique, values of settings of the application are changed such that the operation of the application becomes compliant with the information security policy, and then the values of the settings are transmitted to the application, whereby it is possible to make the application compliant with the information security policy.

However, in checking an application in advance which will be stopped by distribution of the settings compliant with the information security policy, the administrator is required to compare between the settings supported by the application and the settings to be distributed. This causes a problem of more time and effort to be expended as the number of image processing apparatuses is larger.

Further, the same problem is also caused in a case where an application which cannot comply with the distributed settings is made compliant by updating the application. More specifically, the administrator is required to check existence of an updated version of the application, and a security policy item with which the application is made compliant by updating the application, and then compare settings to which the updated application can be set and the settings to be distributed. This also causes the problem of more time and effort to be expended as the number of image processing apparatuses is larger.

SUMMARY OF THE INVENTION

The present invention provides an information processing apparatus that makes it possible to save time and effort expended by an administrator on distribution of settings compliant with a security policy and a control method therefor, an image processing apparatus and a control method therefor, an information processing system and a control method therefor, and a storage medium.

In a first aspect of the present invention, there is provided an information processing apparatus comprising a setting determination unit configured to determine whether or not an application installed in an image processing apparatus can be set to settings compliant with a security policy, the image processing apparatus being an object to which the settings are to be distributed, an acquisition unit configured to acquire, when it is determined by the setting determination unit that the application cannot be set to the settings, a result of determination of whether or not the application can be set to the settings by updating thereof, an update unit configured to cause the application to be updated in a case where the result of determination acquired by the acquisition unit indicates that the application can be set to the settings, and a distribution unit configured to distribute the settings to the image processing apparatus.

In a second aspect of the present invention, there is provided an image processing apparatus to which settings compliant with a security policy are distributed, comprising a providing unit configured to provide application information including an application name and a version of an application installed in the image processing apparatus, and a security policy item supported thereby, a setting unit configured to set the application to distributed settings when the application can be set to the distributed settings, and a control unit configured to cause the application to be stopped when the application cannot be set to the distributed settings.

In a third aspect of the present invention, there is provided an information processing system including an information processing apparatus and an image processing apparatus, comprising a setting determination unit configured to determine whether or not an application installed in the image processing apparatus can be set to settings compliant with a security policy, the image processing apparatus being an object to which the settings are to be distributed, an acquisition unit configured to acquire, when it is determined by the setting determination unit that the application cannot be set to the settings, a result of determination of whether or not the application can be set to the settings by updating thereof, an update unit configured to cause the application to be updated in a case where the result of determination acquired by the acquisition unit indicates that the application can be set to the settings, a distribution unit configured to distribute the settings to the image processing apparatus, a setting unit configured to set the application to distributed settings when the application can be set to the distributed settings, and a control unit configured to cause the application to be stopped when the application cannot be set to the distributed settings.

In a fourth aspect of the present invention, there is provided a method of controlling an information processing apparatus, comprising determining whether or not an application installed in an image processing apparatus can be set to settings compliant with a security policy, the image processing apparatus being an object to which the settings are to be distributed, acquiring, when it is determined by said determining that the application cannot be set to the settings, a result of determination of whether or not the application can be set to the settings by updating thereof, causing the application to be updated in a case where the result of determination acquired by said acquiring indicates that the application can be set to the settings, and distributing the settings to the image processing apparatus.

In a fifth aspect of the present invention, there is provided a method of controlling an image processing apparatus to which settings compliant with a security policy are distributed, comprising providing application information including an application name and a version of an application installed in the image processing apparatus, and a security policy item supported thereby, setting the application to distributed settings when the application can be set to the distributed settings, and causing the application to be stopped when the application cannot be set to the distributed settings.

In a sixth aspect of the present invention, there is provided a method of controlling an information processing system including an information processing apparatus and an image processing apparatus, comprising determining whether or not an application installed in the image processing apparatus can be set to settings compliant with a security policy, the image processing apparatus being an object to which the settings are to be distributed, acquiring, when it is determined by said determining that the application cannot be set to the settings, a result of determination of whether or not the application can be set to the settings by updating thereof, causing the application to be updated in a case where the result of determination acquired by said acquiring indicates that the application can be set to the settings, distributing the settings to the image processing apparatus, setting the application to distributed settings when the application can be set to the distributed settings, and causing the application to be stopped when the application cannot be set to the distributed settings.

In a seventh aspect of the present invention, there is provided a non-transitory computer-readable storage medium storing a computer-executable program for executing a method of controlling an information processing apparatus, wherein the method comprises determining whether or not an application installed in an image processing apparatus can be set to settings compliant with a security policy, the image processing apparatus being an object to which the settings are to be distributed, acquiring, when it is determined by said determining that the application cannot be set to the settings, a result of determination of whether or not the application can be set to the settings by updating thereof, causing the application to be updated in a case where the result of determination acquired by said acquiring indicates that the application can be set to the settings, and distributing the settings to the image processing apparatus.

In an eighth aspect of the present invention, there is provided a non-transitory computer-readable storage medium storing a computer-executable program for executing a method of controlling an image processing apparatus to which settings compliant with a security policy are distributed, wherein the method comprises providing application information including an application name and a version of an application installed in the image processing apparatus, and a security policy item supported thereby, setting the application to distributed settings when the application can be set to the distributed settings, and causing the application to be stopped when the application cannot be set to the distributed settings.

According to the present invention, in a case where it is determined that an application installed in the image processing apparatus cannot be set to settings of a security policy to be distributed, when a result of determination as to whether or not the application can be set to the settings of the security policy to be distributed, by updating thereof, indicates that the application can be set to the settings, the application is updated to a later version and the settings are distributed to the image processing apparatus. Therefore, it is possible to save time and effort to be expended by the administrator on the distribution of the settings compliant with the security policy.

Further features of the present invention will become apparent from the following description of exemplary embodiments (with reference to the attached drawings).

BRIEF DESCRIPTION OF THE DRAWINGS

FIGS. 4A to 4E are diagrams each showing information items related to security policy distribution.

DESCRIPTION OF THE EMBODIMENTS

The present invention will now be described in detail below with reference to the accompanying drawings showing embodiments thereof.

Figure 1:
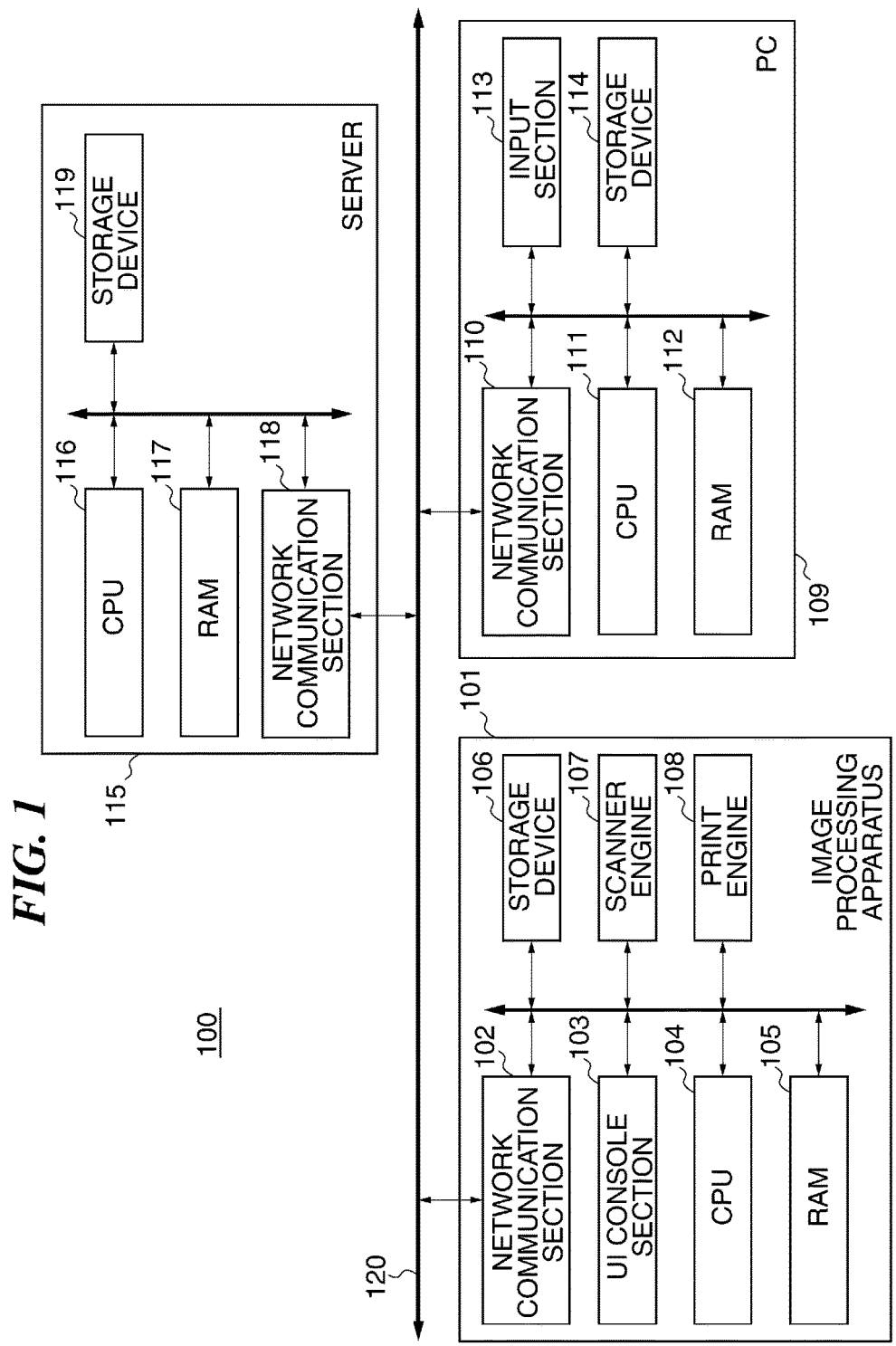
FIG. 1 is a schematic diagram of an information processing system including an image processing apparatus, a server, and a PC, according to an embodiment of the present invention.

FIG. 1 is a schematic diagram of an information processing system 100 including an image processing apparatus 101, a server 115, and a PC 109, according to an embodiment of the present invention.

Referring to FIG. 1, the image processing apparatus 101, the server 115, and the PC 109 are connected via a network 120, and are capable of communicating with one another. Note that FIG. 1 shows an example of the information processing system, but the apparatuses connected to the network and the number of the apparatuses are not limited to those of the system configuration shown in FIG. 1.

The image processing apparatus 101 is comprised of a network communication section 102, a user interface console section 103, a CPU 104, a RAM 105, a storage device 106, a scanner engine 107, and a print engine 108.

The network communication section 102 communicates with an external apparatus, such as the PC 109, via the network 120. The user interface console section 103 that servers as a display section of the image processing apparatus 101, receives settings for the image processing apparatus 101 input by the user's operation, and displays the state of the image processing apparatus 101.

The CPU 104 controls the overall operation of the image processing apparatus 101. The RAM 105 temporarily stores information, such as program codes executed by the CPU 104 and image data. The storage device 106 stores the program codes, image data, and user information.

The scanner engine 107 optically reads an image printed on a paper medium. The print engine 108 prints image data on a paper medium using a well-known technique, such as an electrophotographic technology or an inkjet technology.

The PC 109 is comprised of a network communication section 110, a CPU 111, a RAM 112, an input section 113, and a storage device 114.

The network communication section 110 communicates with an external apparatus, such as the image processing apparatus 101 and the server 115, via the network 120. The CPU 111 controls the overall operation of the PC 109. The RAM 112 temporarily stores information, such as program codes executed by the CPU 111.

The input section 113 receives input from an administrator to the PC 109, and displays various information, such as an application screen. The storage device 114 stores the program codes and data.

The server 115 is comprised of a network communication section 118, a CPU 116, a RAM 117, and a storage device 119.

The network communication section 118 communicates with an external apparatus, such as the PC 109, via the network 120. The CPU 116 controls the overall operation of the server 115. The RAM 117 temporarily stores information, such as program codes executed by the CPU 116. The storage device 119 stores the program codes and data.

Figure 2A:
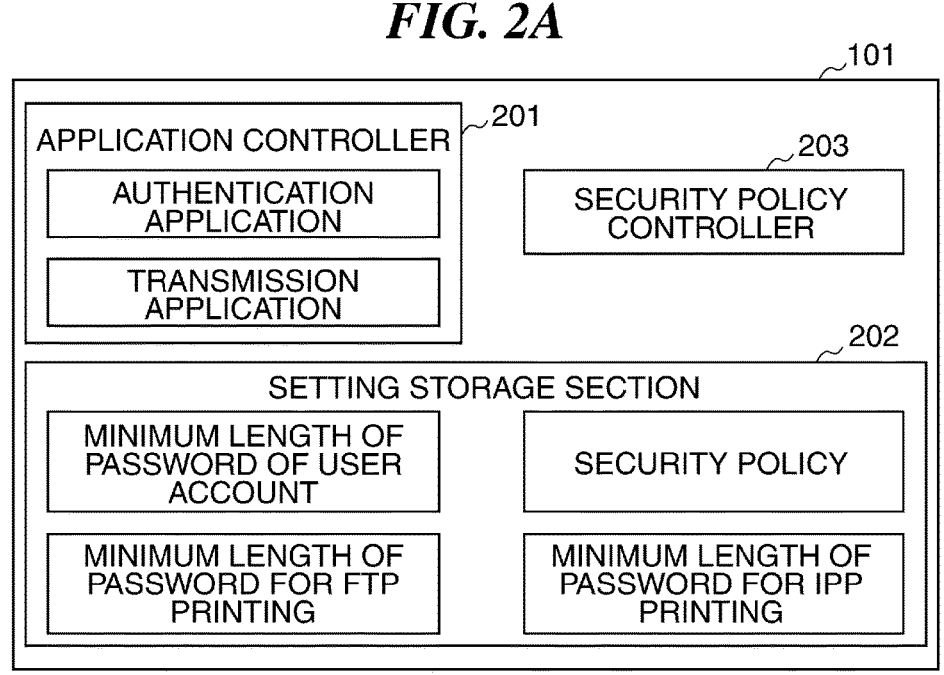
FIG. 2A is a diagram of the software configuration of the image processing apparatus appearing in FIG. 1.

FIG. 2A is a diagram of the software configuration of the image processing apparatus 101 appearing in FIG. 1.

Referring to FIG. 2A, the image processing apparatus 101 is comprised of an application controller 201, a security policy controller 203, and a setting storage section 202.

The application controller 201 controls the installation, starting, and stopping of applications of the image processing apparatus 101, and controls transmission of information on the installed applications via the network communication section 102.

The installed applications are stored in the storage device 106. In the present embodiment, the image processing apparatus 101 is equipped with a JAVA (registered trademark) execution environment, and JAVA (registered trademark) applications are controlled by the application controller 201. The description is given taking the JAVA (registered trademark) execution environment as an example, but an environment of execution of any other programming languages may be employed.

Further, in the present embodiment, it is assumed that two JAVA (registered trademark) applications have been installed and started in the image processing apparatus 101. One of the two applications is an authentication application which provides the image processing apparatus 101 with an authentication function.

The other one is a transmission application which provides the image processing apparatus 101 with a PDF transmission function. With the PDF transmission function, the CPU 104 reads image data using the scanner engine 107 according to the program code stored in the RAM 105, stores the image data read by the scanner engine 107 in the storage device 106, performs format conversion of the stored image data, and then transmits the format-converted image data from the network communication section 102 to a designated destination.

The setting storage section 202 stores settings for operating the image processing apparatus 101, set via the user interface console section 103, and settings compliant with an information security policy (hereinafter referred to as the "security policy"). In the present embodiment, the settings compliant with the security policy are assumed to be "minimum length of a password for FTP printing", "minimum length of a password for IPP printing", and "minimum length of a password of a user account", by way of example.

The "minimum length of a password for FTP printing" is a setting concerning a password required to be set for using the image processing apparatus 101 to perform FTP (file transfer protocol) printing. The FTP printing is a function of the image processing apparatus 101 for automatically printing a file sent using FTP.

The "minimum length of a password for IPP printing" is a setting concerning a password required to be set for using the image processing apparatus 101 to perform IPP (Internet printing protocol) printing.

In the FTP printing and the IPP printing, a user name and a password are set to the image processing apparatus 101 in advance, authentication is performed when either of the FTP printing and the IPP printing is instructed from the PC 109, and the image forming apparatus 101 is enabled to perform printing only if the authentication is successful.

The "minimum length of a password for FTP printing" and "minimum length of a password for IPP printing" are thus settings concerning passwords to be set to the image processing apparatus 101 in advance.

These are settings used to set restrictions on values of the passwords so as to prevent a password which does not satisfy the security policy from being set when setting a new password or changing a password.

The "minimum length of a password of a user account" is a setting concerning a password of a user account required to be set for using the image processing apparatus 101, and this setting is managed by the authentication application.

This setting is used to set restrictions on values of the password so as to prevent a password which does not satisfy the security policy from being set when creating a new user account or changing the password of an existing user account.

For example, in a case where the setting of "minimum length of a password of a user account" is set to 5, if a user attempts to set the password of the user account to characters having a character length of less than 5, an error is displayed, and the password cannot be changed. The settings described above are stored in the storage device 106.

The security policy controller 203 interprets a security policy transmitted to the image processing apparatus 101 via the network communication section 102, and rewrites the settings concerning the security policy stored in the setting storage section 202 to appropriate values.

Figure 2B:
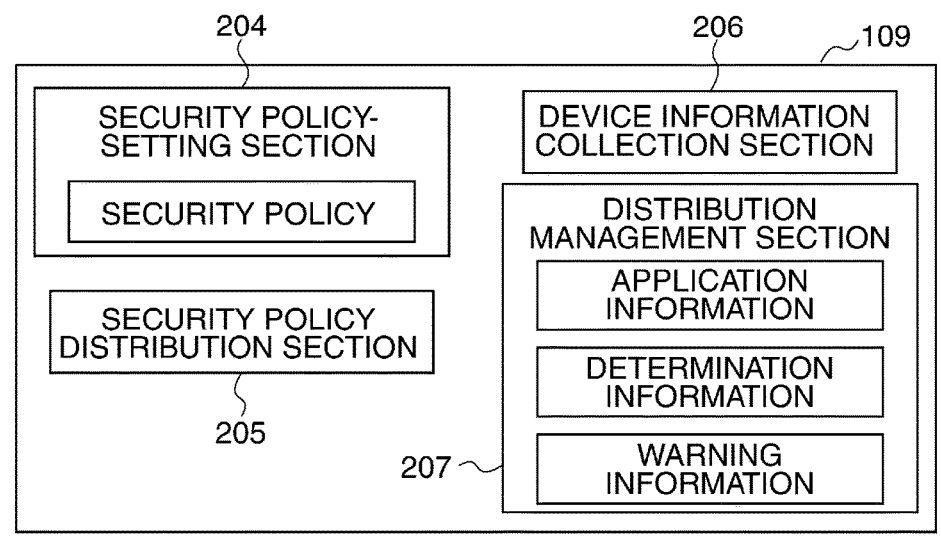
FIG. 2B is a diagram of the software configuration of the PC appearing in FIG. 1.

FIG. 2B is a diagram of the software configuration of the PC 109 appearing in FIG. 1.

Referring to FIG. 2B, the PC 109 is comprised of a security policy-setting section 204, a device information collection section 206, a security policy distribution section 205, and a distribution management section 207.

The security policy-setting section 204 sets a security policy in response to an instruction from an administrator input to the input section 113.

The security policy distribution section 205 distributes settings, set by the security policy-setting section 204 in compliance with the security policy, to the image processing apparatus to be managed. An object to be managed in the present embodiment is the image processing apparatus 101. In the following description, "distributing settings compliant with the security policy" is sometimes simply expressed as "distributing the security policy".

The device information collection section 206 collects application information, referred to hereinafter, of the applications installed in the image processing apparatus to be managed.

The distribution management section 207 controls processing executed before distributing the security policy. More specifically, the distribution management section 207 is operated using the security policy set by the security policy-setting section 204, the application information generated based on applications operated on the image processing apparatus 101, unsupported security policy determination information, and warning information. These information items will be described in detail hereinafter.

Figure 2C:
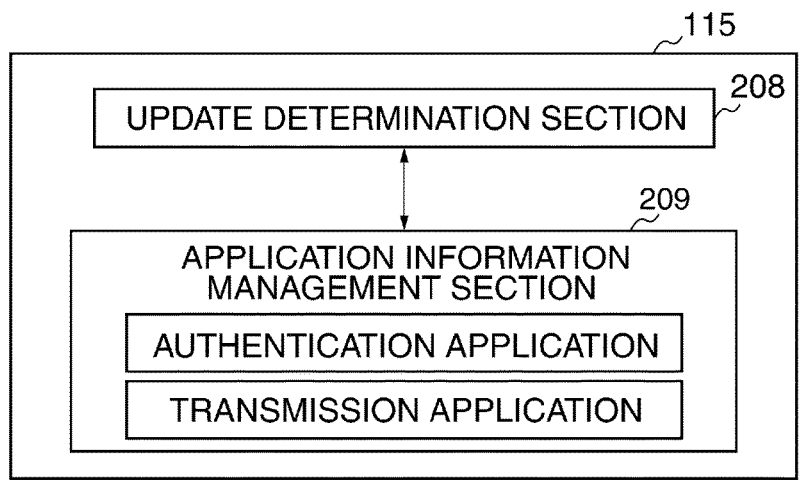
FIG. 2C is a diagram of the software configuration of the server appearing in FIG. 1.

FIG. 2C is a diagram of the software configuration of the server 115 appearing in FIG. 1.

Referring to FIG. 2C, the server 115 is comprised of an update determination section 208 and an application information management section 209.

The update determination section 208 determines, based on the unsupported security policy determination information sent to the network communication section 118 via the network 120, whether or not there is an updated version of an application in the server 115.

The application information management section 209 manages information on the latest applications which can be operated on the image processing apparatus 101. Specifically, the application information management section 209 manages information of the authentication application and the transmission application.

Next, the settings of the security policy will be described taking the security policy items of "minimum length of a password" and "log acquisition" as an example.

Figure 3:
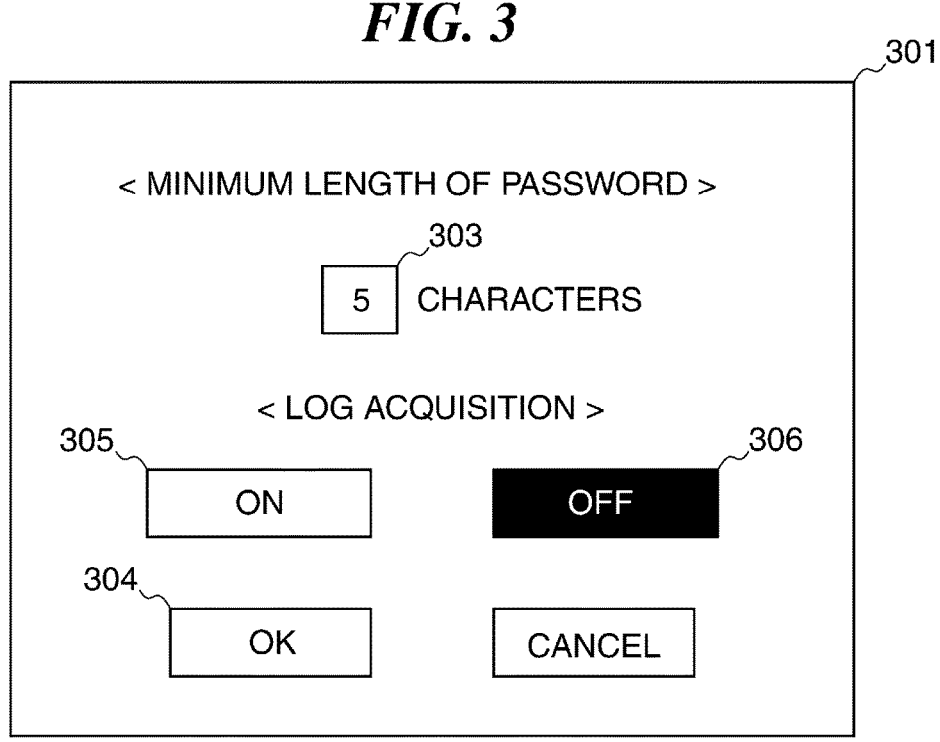
FIG. 3 is a diagram showing an example of a security policy-setting screen displayed on an input section of the PC appearing in FIG. 1.

FIG. 3 is a diagram showing an example of a security policy-setting screen displayed on the input section 113 of the PC 109 appearing in FIG. 1.

The security policy-setting screen, denoted by reference numeral 301, is displayed when an instruction for setting a security policy is received from a user via the input section 113.

Referring to FIG. 3, an item of "minimum length of a password" indicates a security policy item which forces the minimum length of a password, which is a condition to be satisfied in setting each password to the image processing apparatus 101, and the administrator sets a value of the length in a text field 303. This example shows a case where the security policy item "minimum length of a password" is set to 5, which sets the smallest number of characters to be used for the password.

An item of "log acquisition" indicates a security policy item which forces acquisition of a log for each of functions provided by the image processing apparatus 101. Radio buttons 305 and 306 are used for setting the security policy item "log acquisition". This example shows a case where the security policy item "log acquisition" is set to off, i.e. the log is not to be acquired.

When the input section 113 receives depression of an "OK" button 304 on the security policy-setting screen 301, the security policy-setting section 204 generates a security policy according to the input settings on the security policy-setting screen 301.

The generated security policy is stored in the storage device 114 by the security policy-setting section 204.

The following example shows an example of the security policy thus set, which is expressed in XML format:

```
<?xml version="1.0"?>
<password_minimum_length>
5
</password_minimum_length>
```

In this XML document, "password_minimum_length" represents "minimum length of a password". Further, numeral "5" indicates a value set as the "minimum length of a password". In the present embodiment, since "log acquisition" is set to off, the security policy item "log acquisition" is not generated, but the security policy item "minimum length of a password" is generated. A method of expressing the security policy is not limited to the XML format, but any other data format may be employed. Further, the security policy may be expressed by a method other than that of the XML document.

Next, distribution of the security policy will be described. Distribution of the security policy set by the administrator is started according to an instruction input to the input section 113 by the administrator.

When the PC 109 receives a distribution instruction input to the input section 113, the security policy distribution section 205 reads the security policy from the storage device 114, and distributes the read security policy to the image processing apparatus 101 via the network communication section 110 and the network 120. A specific description will be given of processing concerning this distribution. First, information items related to the security policy distribution will be described beforehand.

FIGS. 4A to 4E are diagrams each showing information items related to the security policy distribution.

FIGS. 4A, 4B and 4C show examples of application information transmitted to the device information collection section 206 of the PC 109 by the application controller 201 of the image processing apparatus 101. These information items are stored in the RAM 105 of the PC 109. The application controller 201 corresponds to a providing unit configured to provide application information including an application name, a version, and a supported security policy item of an application installed in the image processing apparatus.

Referring to FIGS. 4A, 4B, and 4C, the application information is composed of the items of "device name", "application name", "version", and "supported security policy items".

The device name indicates a name of the image processing apparatus, and this also applies to FIG. 4D. In the illustrated example, the names of the image processing apparatuses are simply expressed by A and B. The application name is a name of an application installed in the image processing apparatus, and this also applies to FIGS. 4D and 4E.

The version is a version of an application, and this also applies to FIGS. 4D and 4E. The supported security policy items indicate security policy items supported by the application, and this also applies to FIG. 4E.

For example, in FIG. 4A, a login application with version number 1.0 and a transmission application with version number 2.0 have been installed in the image processing apparatus having the device name A. Further, the login application supports the security policy item "log acquisition", and the transmission application supports the security policy item "log acquisition" and the security policy item "minimum length of a password".

When the application information is collected from the image processing apparatuses as described above, the distribution management section 207 of the PC 109 determines whether or not the applications can support the security policy to be distributed, and the determination result is stored in the RAM 105 as unsupported security policy determination information, described with reference to FIG. 2B. In this determination, the distribution management section 207 determines whether or not each application can be set to settings of the security policy, based on the application information including the application name, the version, and the supported security policy items of the application installed in the image processing apparatus 101.

FIG. 4D shows the unsupported security policy determination information indicative of the result of the determination by the distribution management section 207. Referring to FIG. 4D, the unsupported security policy determination information is composed of the items of "device name", "application name", "version", and "unsupported security policy items".

FIG. 4D shows an example in which the security policy item "minimum length of a password" is not supported. This unsupported security policy determination information indicates a result of the determination by the distribution management section 207 that a device (device A) on which the application information shown in FIG. 4A is acquired cannot support a security policy item to be distributed ("minimum length of a password"). If the security policy is distributed in this state without any change, the login application of the device A will be stopped, as described hereinafter.

There is a possibility that a security policy item which is unsupported as described above can be supported by updating the application to a later version. To this end, a list of applications is stored in the storage device 114 of the server 115.

FIG. 4E shows the list of applications (application list) stored in the storage device 114 of the server 115.

Referring to FIG. 4E, the application list is composed of the items of "application name", "version", and "supported security policy items".

For example, although the login application with version number 1.0 only is compliant with the security policy item "log acquisition", the same application with version number 1.1 is compliant with the security policy item "minimum length of a password" as well.

Therefore, it is clear that the login application can support the security policy item "minimum length of a password" when updated to a version 1.1.

This application list is compared with the above-mentioned unsupported security policy determination information. For example, when the application list is compared with the unsupported security policy determination information shown in FIG. 4D, a comparison result indicating that the login application can be updated to a later version, and will become capable of supporting the "minimum length of a password" by the update.

Processing concerning the distribution will be described using the above information. When the PC 109 receives a distribution instruction from the administrator, the device information collection section 206 requests the application information described with reference to FIG. 4A from the image processing apparatus 101 to which the security policy is to be distributed via the network 120.

When the application information has been collected by the device information collection section 206, the distribution management section 207 stores the collected application information in the RAM 112. The process executed thereafter will be described using flowcharts.

Figure 5A:
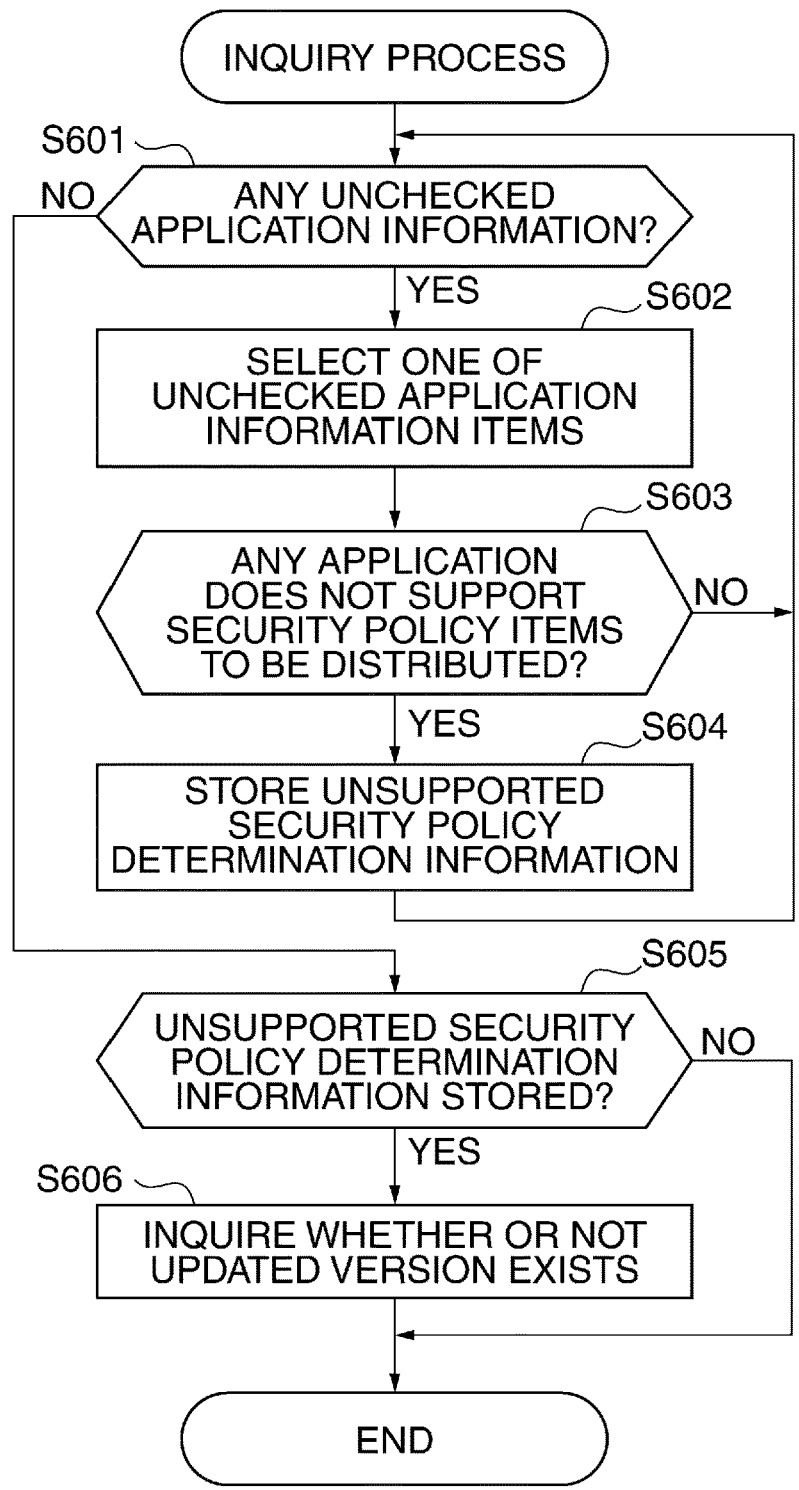
FIG. 5A is a flowchart of an inquiry process executed by a CPU of the PC appearing in FIG. 1.
Figure 5B:
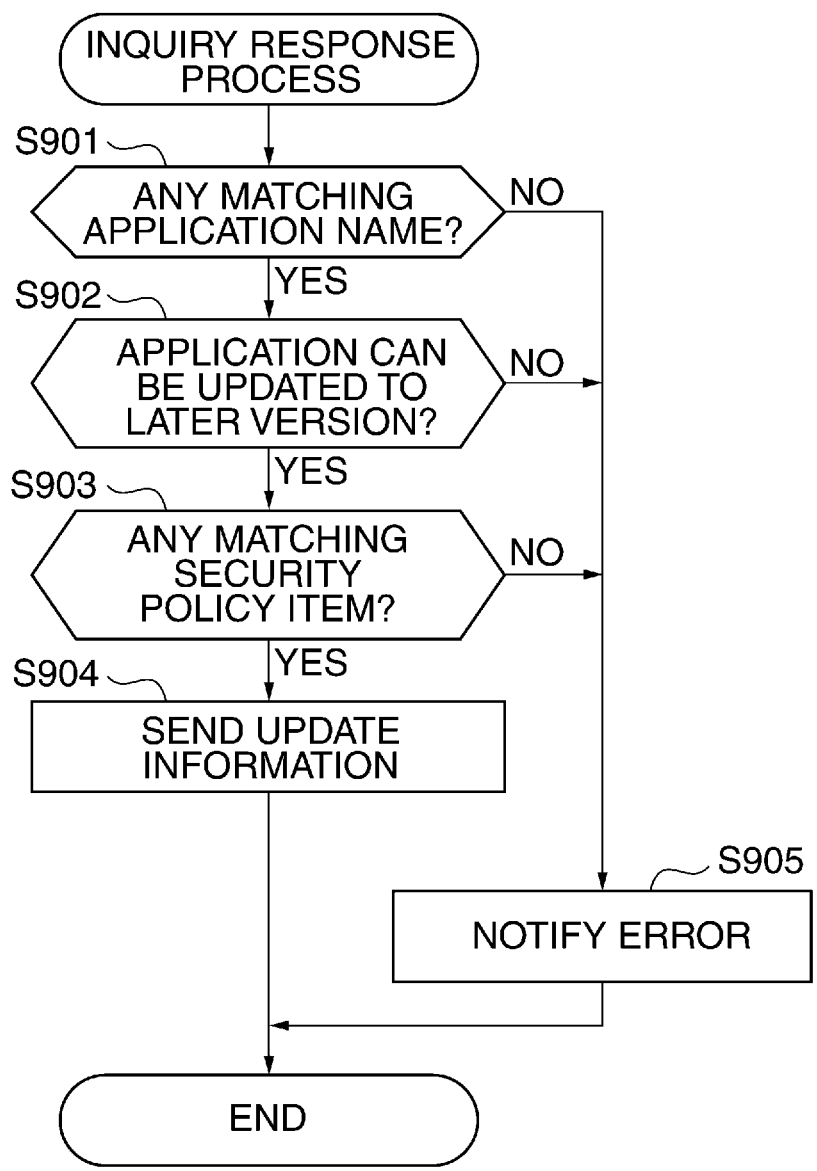
FIG. 5B is a flowchart of an inquiry response process executed by a CPU of the server appearing in FIG. 1.

FIG. 5A is a flowchart of an inquiry process executed by the CPU 111 of the PC 109 appearing in FIG. 1, and FIG. 5B is a flowchart of an inquiry response process executed by the CPU 116 of the server 115 appearing in FIG. 1.

Referring to FIG. 5A, the distribution management section 207 determines whether or not there is any unchecked application information (step S601). The above-mentioned "unchecked application information" refers to information on an application which is stalled in the image processing apparatus and has not yet been checked as to whether or not the application is compliant with the security policy to be distributed.

If it is determined in the step S601 that there is any unchecked application information (YES to the step S601), the distribution management section 207 selects one item of the unchecked application information (step S602).

Then, the distribution management section 207 compares the security policy to be distributed and the supported security policy items in the application information to thereby determine whether or not there is an application which does not support the security policy (step S603). In other words, in the step S603, the distribution management section 207 determines whether or not each application can be set to settings compliant with the security policy. The step S603 corresponds to the operation of a setting determination unit configured to determine whether or not an application installed in an image processing apparatus can be set to settings compliant with a security policy, the image processing apparatus being an object to which the settings are to be distributed.

For example, in the case of the application information shown in FIG. 4B, it is determined that there is no application which does not support the security policy item "minimum length of a password". On the other hand, in the case of the application information shown in FIG. 4A, it is determined that there is an application which does not support the security policy item "minimum length of a password".

If it is determined in the step S603 that the security policy is supported by all applications (NO to the step S603), the distribution management section 207 returns to the step S601.

On the other hand, if it is determined in the step S603 that there is any application which does not support the security policy (YES to the step S603), the unsupported security policy determination information shown in FIG. 4D is stored in the RAM 112 (step S604), and the distribution management section 207 returns to the step S601.

Referring back to the step S601, if it is determined in the step S601 that there is no unchecked application information (NO to the step S601), the distribution management section 207 determines whether or not the unsupported security policy determination information has been stored (step S605).

If it is determined in the step S605 that the unsupported security policy determination information has not been stored (NO to the step S605), the CPU 111 immediately terminates the present process.

On the other hand, if it is determined in the step S605 that the unsupported security policy determination information has been stored (YES to the step S605), the distribution management section 207 transmits the unsupported security policy determination information to the server 115 to thereby inquire whether or not there is any updated version of the application (step S606). This step S606 includes acquiring the update information indicative of a result of determination of whether or not the application can be set to the settings by updating thereof, or an error. That is, if the application can be set to the settings by updating, the distribution management section 207 acquires the update information, whereas if not, the distribution management section 207 acquires an error. Then, the present process is terminated.

The step S606 corresponds to the operation of an acquisition unit configured to acquire, when it is determined that the application cannot be set to the settings, a result of determination of whether or not the application can be set to the settings by updating thereof. The PC 109 executes a distribution process described hereinafter with reference to FIG. 6 after execution of the above-described inquiry process.

The description shifts to the inquiry response process executed by the server 115, and when the server 115 receives the inquiry from the PC 109 about whether or not there is an updated version of the application, the update determination section 208 stores the received unsupported security policy determination information in the RAM 117.

The update determination section 208 compares the unsupported security policy determination information with the application list shown in FIG. 4E, and determines whether or not there is any application name matching between the unsupported security policy determination information and the application list (step S901).

If it is determined in the step S901 that there is no matching application name (NO to the step S901), the update determination section 208 notifies the PC 109 of an error indicating an application name in the unsupported security policy determination information which does not match and the device name associated therewith (step S905), followed by terminating the present process.

On the other hand, if it is determined in the step S901 that there is any application name matching between them (YES to the step S901), the update determination section 208 determines whether or not the application having the matching application name can be updated to a later version (step S902). For example, if the version number of an application indicated in the application list is larger than the version number of the same application indicated in the unsupported security policy determination information, it is determined that the application can be updated to a later version.

If it is determined in the step S902 that the application cannot be updated to a later version (NO to the step S902), the update determination section 208 proceeds to the step S905.

On the other hand, if it is determined in the step S902 that the application can be updated to a later version (YES to the step S902), the update determination section 208 determines whether or not there is any matching security policy item (step S903).

More specifically, the update determination section 208 determines whether or not, of all security policy items which can be supported after updating the application to a later version, there is any security policy item matching an unsupported security policy item in the unsupported security policy determination information.

If it is determined in the step S903 that there is no matching security policy item (NO to the step S903), the update determination section 208 proceeds to the step S905.

On the other hand, if it is determined in the step S903 that there is any matching security policy item (YES to the step S903), the update determination section 208 notifies the PC 109 of the update information (step S904), followed by terminating the present process.

More specifically, the update determination section 208 notifies the update information management section 209 of the update information including an application name of an application about which the answer to the question of the step S903 was affirmative, a version to which the application should be updated, and a device name associated therewith.

Then, the application information management section 209 notifies the PC 109 of the received update information. For example, in a case where the application list shown in FIG. 4E and the unsupported security policy determination information shown in FIG. 4D are compared, the update information including "login application, 1.1, A" is notified.

As described above, to the server 115 storing the application list including an application name, a version, and security policy items supported by the version of each application, the PC 109 transmits the unsupported security policy determination information including the application name and version of an application installed in the image processing apparatus 101, and a security policy item of the security policy to be distributed, which defines a setting to which the application of the version cannot be set. The server 115 compares the application list and the unsupported security policy determination information to thereby determine whether the application can be set to the setting by updating the same to a later version, and notifies the PC 109 of a result of the determination (update information or an error) and the PC 109 acquires the result of the determination.

The above-described inquiry process is executed the number of times corresponding to the number of items of the unsupported security policy determination information. Alternatively, the steps S904 and S905 for performing notification to the PC 109 may be executed after the steps S901 to S903 have been executed for all items of the unsupported security policy determination information.

Figure 6:
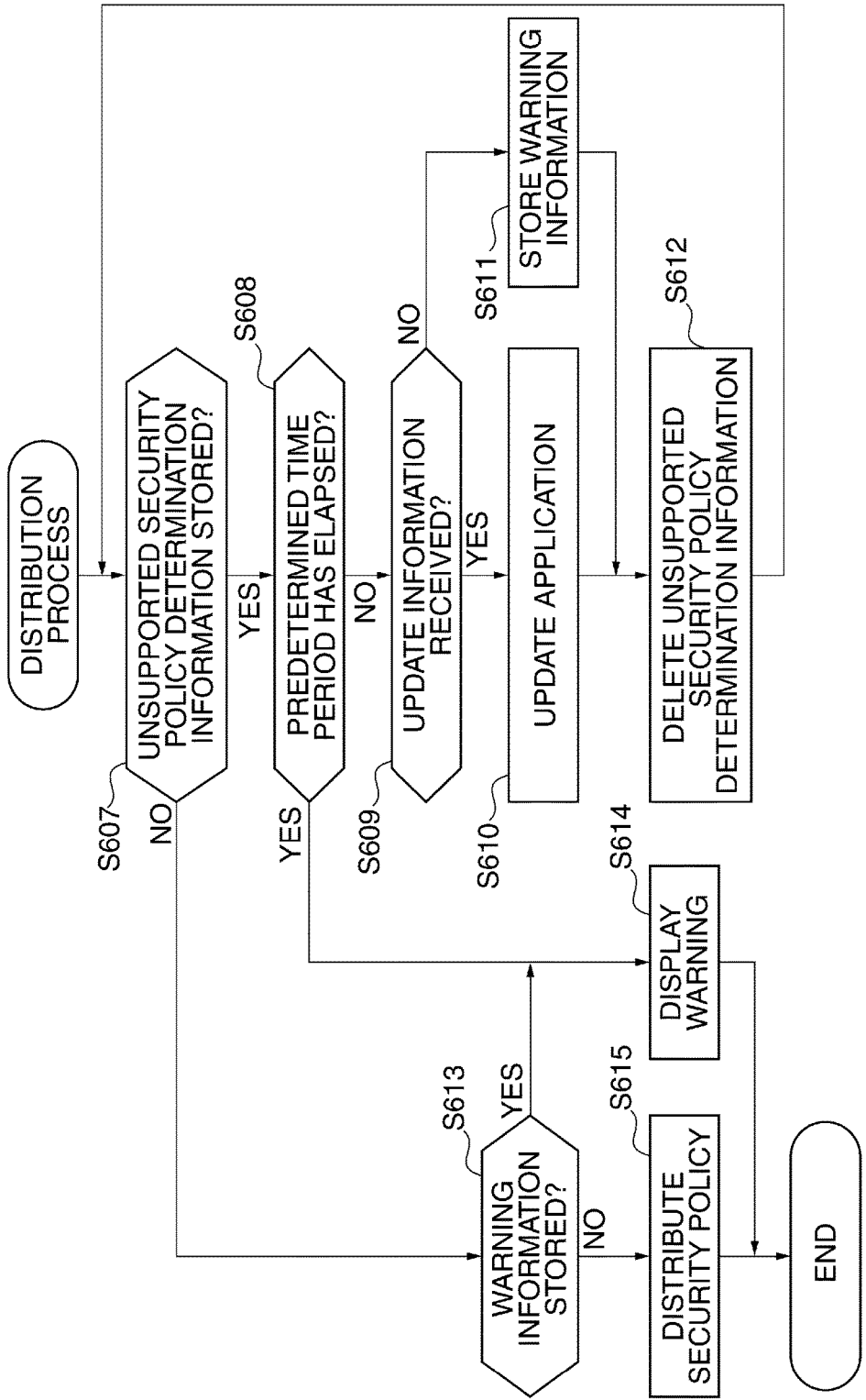
FIG. 6 is a flowchart of a distribution process executed by the CPU of the PC appearing in FIG. 1.

FIG. 6 is a flowchart of the distribution process executed by the CPU 111 of the PC 109 appearing in FIG. 1.

Referring to FIG. 6, the distribution management section 207 determines whether or not the unsupported security policy determination information has been stored in the RAM 112 (step S607).

If it is determined in the step S607 that the unsupported security policy determination information has been stored (YES to the step S607), the distribution management section 207 determines whether or not a predetermined time period has elapsed after executing the inquiry process in FIG. 5A (step S608). This process is executed for determining occurrence of an event that no response is received from the server 115 for some reason.

If it is determined in the step S608 that the predetermined time period has elapsed (YES to the step S608), the distribution management section 207 displays a warning screen indicative of no response having been received (step S614), followed by terminating the present process.

On the other hand, if it is determined in the step S608 that the predetermined time period has not elapsed (NO to the step S608), the distribution management section 207 determines whether or not the update information has been received from the server 115 (step S609).

If it is determined in the step S609 that the update information has been received from the server 115 (YES to the step S609), the distribution management section 207 cause the device indicated by the device name in the update information (the image processing apparatus indicated by the device A in the case of the aforementioned example of the update information including "login application, 1.1, A") to update the application indicated in the update information (the login application in the same example) to a version indicated in the update information (version 1.1 in the same example) (step S610). The step S610 corresponds to the operation of an update unit configured to cause the application to be updated in a case where the acquired result of determination indicates that the application can be set to the settings. Note that processing performed by the PC 109 for causing the image processing apparatus 101 to update an application installed therein is a well-known technique, and hence description thereof is omitted here.

Then, the distribution management section 207 deletes the unsupported security policy determination information corresponding to the update information (step S612), and returns to the step S607.

On the other hand, if it is determined in the step S609 that an error has been notified instead of the update information (NO to the step S609), the distribution management section 207 stores the warning information including the application name and the device name indicated in the error notification in the RAM 112 (step S611), deletes the unsupported security policy determination information associated with the error notification (step S612), and returns to the step S607.

Referring back to the step S607, if it is determined in the step S607 that the unsupported security policy determination information has not been stored (NO to the step S607), the distribution management section 207 determines whether or not the warning information has been stored (step S613).

If it is determined in the step S613 that the warning information has not been stored (NO to the step S613), the application installed in the image processing apparatus can support the security policy to be distributed, and hence the security policy distribution section 205 distributes the security policy (step S615), followed by terminating the present process. The step S615 corresponds to the operation of a distribution unit configured to distribute the settings to the image processing apparatus.

On the other hand, if it is determined in the step S613 that the warning information has been stored (YES to the step S613), the security policy distribution section 205 displays a warning screen (step S614), followed by terminating the present process.

Figure 7:
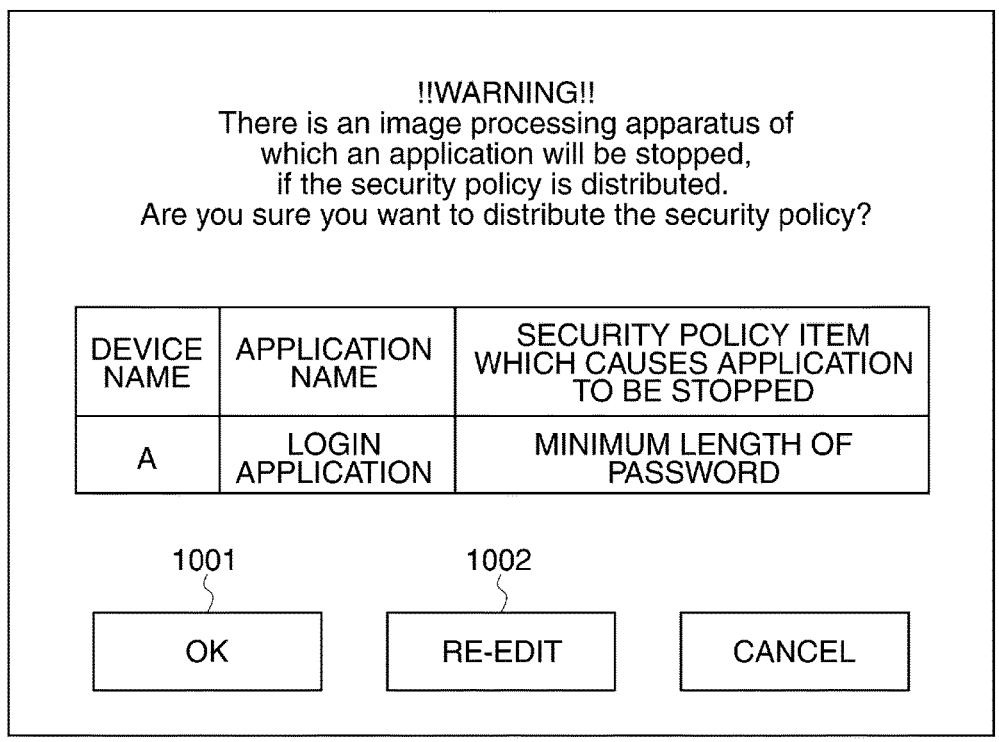
FIG. 7 is a diagram showing an example of a warning screen displayed in a step of the distribution process in FIG. 6 when warning information has been stored.

FIG. 7 is a diagram showing an example of the warning screen displayed in the step 614 of the distribution process in FIG. 6 in a case where the warning information has been stored.

The warning screen shown in FIG. 7 displays a warning that the login application installed in the image processing apparatus having the device name A does not support the security policy item "minimum length of a password", and hence the login application will be stopped. Thus, in a case where an application cannot be set to settings of the security policy to be distributed, the warning screen notifying a user that the application will be stopped by distributing the settings, on the input section 113 which also servers as the display section.

Upon receipt of a notification of depression of an OK button 1001 on this warning screen, from the input section 113, the security policy distribution section 205 starts distribution of the security policy to the image processing apparatus 101.

On the other hand, upon receipt of a notification of depression of a re-edit button 1002 from the input section 113, the security policy distribution section 205 notifies the security policy-setting section 204 of the start of the security policy setting.

In response to this, the security policy setting section 204 executes a process executed when a security policy-setting instruction is received from the user via the input section 113.

When the above-described distribution process causes the security policy to be distributed, the image processing apparatus 101 receives the security policy at the network communication section 102. Here, it is assumed that the security policy has been received as the above-mentioned XML document.

Upon receipt of the security policy, the security policy controller 203 causes the setting storage section 202 to store the received security policy.

The security policy controller 203 interprets the stored security policy, and causes applications of the image processing apparatus 101 related to the security policy to be set to the settings indicated by the security policy. The security policy controller 203 corresponds to a setting unit configured to set the application to distributed settings when the application can be set to the distributed settings.

In the present embodiment, the settings concerning the security policy item "minimum length of a password" in the image processing apparatus 101 are the setting of "minimum length of a password for FTP printing" and that of "minimum length of a password for IPP printing".

Since the setting of "minimum length of a password" which is the received security policy item is 5, the security policy controller 203 causes the setting storage section 202 to rewrite each of the setting of "minimum length of a password for FTP printing" and that of "minimum length of a password for IPP printing" to 5.

Further, the security policy controller 203 notifies the application controller 201 that the security policy item "minimum length of a password" has been set. The application controller 201 determines whether or not the applications which have been installed in the image processing apparatus 101 and have been started support the security policy item "minimum length of a password".

A MEAP (registered trademark) application contains file describing information, called a manifest, on the application. The application controller 201 determines whether or not the application supports the security policy item, by determining whether or not "minimum length of a password" is described as a supported security policy item in the manifest.

In a case where the started application supports the security policy item, the application controller 201 notifies the application that the security policy item is set.

Upon receipt of the notification, the application acquires the security policy item stored by the setting storage section 202, and sets "minimum length of a password of a user account" stored by the setting storage section 202 to a setting compliant with the security policy item.

On the other hand, in a case where the started application does not support the security policy item, the application controller 201 stops the application. The application controller 201 corresponds to a control unit configured to cause the application to be stopped when the application cannot be set to the distributed settings.

Although in the present embodiment, the description has been given of the method of determining whether or not an application supports a security policy item by reading a manifest, any other method may be employed. For example, the application may notify the application controller 201 of security policy items supported by the application at a time when the application has been started.

The application controller 201 having received the notification may store the received information in the RAM 112, and when the security policy is distributed, may use the information for determining whether or not the application supports the items of the distributed security policy.

According to the present embodiment, in the case where a security policy can be applied to a device without damaging functions thereof by updating an application related to the security policy, this processing is automatically executed, which saves time and effort of the administrator.

Further, it is possible to know beforehand whether or not any function of the image processing apparatus will be impaired by distribution of the security policy, which saves time and effort of the administrator.

According to the above-described embodiment, it is possible to save the time and effort of the administrator, and thereby easily set and distribute a security policy.

According to the above-described present embodiment, in a case where it is determined that any application installed in the image processing apparatus 101 cannot be set to settings compliant with a security policy (YES to the step S603), if it is determined that the application can be set to the settings by updating thereof (YES to the step S609), the application is caused to be updated (step S610), and the settings are distributed to the image processing apparatus (step S615). This makes it possible to save time and effort to be expended by the administrator on distribution of settings compliant with the security policy.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181353 filed Sep. 2, 2013, which is hereby incorporated by reference herein in its entirety.

What is claimed is:

1. An information processing apparatus comprising:
at least one memory; and
at least one processor coupled to the at least one memory and configured to execute instructions that, when executed, cause the information processing apparatus to:
receive new settings for at least one image processing apparatus connected to the information processing apparatus, the new settings compliant with a security policy for distribution to the at least one image processing apparatus, the security policy relating to strength of a password to be input to an application installed in the at least one image processing apparatus;
receive, from the at least one image processing apparatus, application information including an application name of one or more applications installed in the at least one image processing apparatus, a version information of the one or more applications installed in the at least one image processing apparatus, and information indicating one or more security policy items supported by the one or more applications;
detect, among the one or more applications installed in the at least one image processing apparatus, based on the received application information, the version information, and the information indicating the one or more security policy items, a first application which does not support the new settings compliant with the security policy;

acquire information indicating that an updated version of the first application, which supports the new settings compliant with the security policy, is not stored in the at least one memory;

display a confirmation screen, prior to distributing the security policy to the at least one image processing apparatus, warning that the first application does not support the security policy and will be stopped in response to distributing the new settings compliant with the security policy;

stop the first application in response to receiving a confirmation to stop the first application; and distribute the new settings compliant with the security policy to the at least one image processing apparatus after receiving the confirmation to stop the first application.

2. The information processing apparatus according to claim 1, wherein the first application is detected based on application information including at least one of an application name and a version of the application installed in the image processing apparatus, and information indicating security policy items with which the application can comply.

3. The information processing apparatus according to claim 1, wherein at least one of an application name of the detected first application, a version information of the detected first application, and information indicating the security policy to be distributed to the image processing apparatus, is transmitted to a server to thereby acquire from the server the information indicating whether or not the detected first application can be updated to the second application.

4. An image processing apparatus to which new settings compliant with a security policy are distributed from an information processing apparatus, comprising:

at least one memory; and at least one processor coupled to the at least one memory and configured to execute instructions that, when executed, cause the image processing apparatus to:

provide, to the information processing apparatus, application information including an application name of an application installed in the image processing apparatus, a version information of the application installed in the image processing apparatus, and information indicating one or more security policy items supported by the application;

determine, based on the provided application information, the version information, and the information indicating the one or more security policy items, that the application installed in the image processing apparatus does not support the new settings compliant with the security policy to be distributed to the image processing apparatus, wherein the security policy relates to strength of a password to be input to the application;

determine that the application cannot be updated to a version that supports the new settings compliant with the security policy;

display a confirmation screen on a display of the information processing apparatus, the confirmation screen being a screen to provide notification and receive confirmation, prior to distributing the security policy to the image processing apparatus, that the application does not support the new settings compliant with the security policy and will be stopped in response to distribution of the security policy;

receive a confirmation to stop the application that does not support the new settings compliant with the security policy;

distribute the new settings to the image processing apparatus; and stop, when the new settings compliant with the security policy are distributed, the application that does not support the distributed settings.

5. An information processing system including:

an information processing apparatus including at least one first memory and at least one first processor coupled to the at least one first memory; and an image processing apparatus connected to the information processing apparatus, the image processing apparatus including at least one second memory and at least one second processor coupled to the at least one second memory, the at least one first processor and the at least one second processor configured to execute instructions that, when executed, cause the information processing apparatus or the image processing apparatus to:

receive new settings compliant with a security policy for distribution to the image processing apparatus, wherein the security policy relates to strength of a password to be input to an application installed in image processing apparatus;

acquire application information including an application name of one or more applications installed in the image processing apparatus, a version information of the one or more applications installed in the image processing apparatus, and information indicating one or more security policy items supported by the one or more applications;

detect, among the one or more applications installed in the image processing apparatus, based on the acquired application information, the version information, and the information indicating the one or more security policy items, a first application which does not support the new settings compliant with the security policy;

acquire information indicating that an updated version of the first application, which supports the new settings compliant with the security policy, is not stored in the at least one first memory;

display a confirmation screen, prior to distributing the security policy to the at least one image processing apparatus, warning that the first application does not support the security policy and will be stopped in response to distributing the new settings compliant with the security policy;

stop the first application in response to receiving a confirmation to stop the first application; and distribute the new settings compliant with the security policy to the image processing apparatus after receiving the confirmation to stop the first application.

6. A method of distributing new settings compliant with a security policy, the method comprising:

receiving new settings for at least one image processing apparatus connected to an information processing apparatus, the new settings compliant with a security policy for distribution to the at least one image processing apparatus, the security policy relating to strength of a password to be input to an application installed in the at least one image processing apparatus;

acquiring application information including an application name of one or more applications installed in the at least one image processing apparatus, a version information of the one or more applications installed in the at least one image processing apparatus, and information indicating one or more security policy items supported by the one or more applications;

detecting, among the one or more applications installed in the at least one image processing apparatus, based on the acquired application information, the version information, and the information indicating the one or more security policy items, a first application which does not support the new settings compliant with the security policy;

acquiring information indicating that the first application cannot be updated to an updated version of the first application which supports the new settings compliant with the security policy;

causing a confirmation screen to be displayed, prior to distributing the security policy to the at least one image processing apparatus, warning that the first application does not support the security policy and will be stopped in response to distributing the new settings compliant with the security policy;

stopping the first application in response to receiving a confirmation to stop the first application; and distributing the new settings compliant with the security policy to the at least one image processing apparatus after receiving the confirmation to stop the first application.

7. The method according to claim 6, wherein said detecting includes detecting the first application based on application information including at least one of an application name and a version of the application installed in the at least one image processing apparatus, and information indicating security policy items with which the application can comply.

8. The method according to claim 6, wherein said acquiring includes transmitting at least one of an application name of the detected first application, a version information of the detected first application, and information indicating the security policy to be distributed to the at least one image processing apparatus, to a server to thereby acquire from the server the information indicating whether or not the detected first application can be updated to the second application.

9. A non-transitory computer-readable storage medium storing a computer-executable program for executing a method of distributing new settings compliant with a security policy, the method comprising:

receiving new settings for at least one image processing apparatus connected to an information processing apparatus, the new settings compliant with a security policy for distribution to the at least one image processing apparatus, the security policy relating to strength of a password to be input to an application installed in the at least one image processing apparatus;

acquiring application information including an application name of one or more applications installed in the at least one image processing apparatus, a version information of the one or more applications installed in the at least one image processing apparatus, and information indicating one or more security policy items supported by the one or more applications;

detecting, among the one or more applications installed in the at least one image processing apparatus, based on the acquired application information, the version information, and the information indicating the one or more security policy items, a first application which does not support the new settings compliant with the security policy;

acquiring information indicating that the first application cannot be updated to an updated version of the first application which supports the new settings compliant with the security policy;

causing a confirmation screen to be displayed, prior to distributing the security policy to the at least one image processing apparatus, warning that the first application does not support the security policy and will be stopped in response to distributing the new settings compliant with the security policy;

stopping the first application in response to receiving a confirmation to stop the first application; and distributing the new settings compliant with the security policy to the at least one image processing apparatus after receiving the confirmation to stop the first application.

10. The information processing apparatus according to claim 1, wherein the security policy defines strength of authentication information in the information processing apparatus, wherein the first application is a login application, and wherein the warning screen is displayed in a case where the login application uses authentication information whose strength is weaker than the strength of the authentication information defined in the security policy.

11. An information processing apparatus comprising:

at least one memory; and at least one processor configured to work with the memory and execute instructions that, when executed, cause the information processing apparatus to:

receive an instruction to distribute a security policy for enforcing using a password having a length longer than a predetermined length to at least one image processing apparatus;

acquire application information including an application name of one or more applications installed in the at least one image processing apparatus, a version information of the one or more applications installed in the at least one image processing apparatus, and information indicating a security policy item corresponding to a password length supported by the one or more applications;

detect, among the one or more applications installed in the at least one image processing apparatus, based on the acquired application information, the version information, and the information indicating the security policy item, at least one application which does not support the length longer than the predetermined length of the password;

acquire information indicating that an updated version of the at least one application which does not support the length longer than the predetermined length of the password is not stored in the at least one memory;

display a message screen, including an input portion for inputting whether to distribute the security policy, prior to distributing the security policy to the at least one image processing apparatus, that the at least one application does not support the length longer than the predetermined length of the password and will be stopped in response to distributing the security policy to the at least one image processing apparatus having the at least one application which does not support the length longer than the predetermined length of the password; and distribute the security policy for enforcing using the password having the length longer than the predetermined length and causing the at least one application to stop in the at least one image processing apparatus after accepting the input via the input portion after displaying the message screen.

* * * * *